May 3, 1960 A. B. HILL ET AL 2,935,538
PROCESS FOR PREPARATION OF METHYLCYCLOPENTADIENE DIMER
Filed July 28, 1958
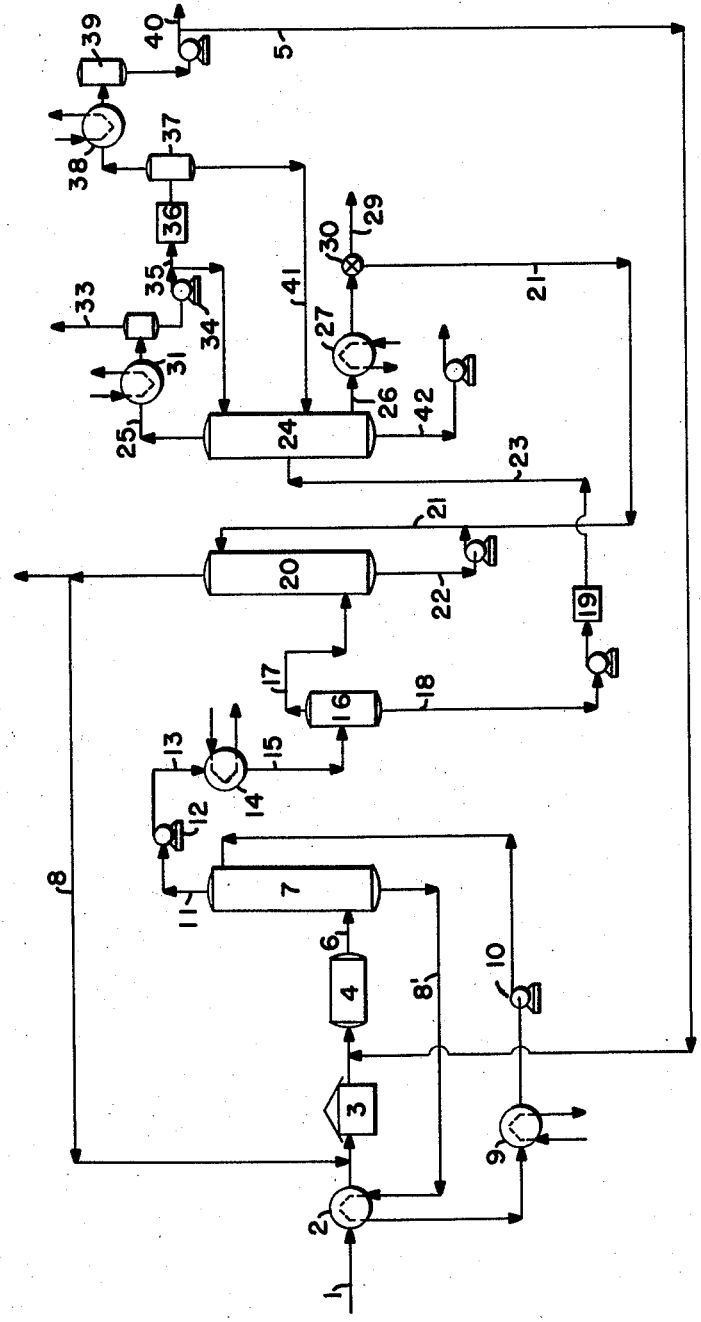
Arthur B. Hill
Donald W. Wood   Inventors
By *Seymour Stahl* Attorney

2,935,538
Patented May 3, 1960

2,935,538
PROCESS FOR PREPARATION OF METHYL-CYCLOPENTADIENE DIMER

Arthur B. Hill, Green Brook, and Donald W. Wood, Westfield, N.J., assignors to Esso Research and Engineering Company, a corporation of Delaware Application July 28, 1958, Serial No. 751,197

9 Claims. (Cl. 260—666)

This invention relates to the preparation and separation of methylcyclopentadiene dimer product from hydrocarbon streams containing methylcyclopentane, methylcyclopentene or mixtures thereof.

In general the present process contemplates preheating the methylcyclopentane and/or methylcyclopentene containing feed and passing the feed stream to a dehydrogenation zone wherein the compounds are subjected to dehydrogenation conditions in the presence of a dehydrogenation catalyst and further preferably in the presence of hydrogen gas. The dehydrogenated product now containing substantial amounts of methylcyclopentadiene may then be passed through a quench tower and subsequently to a liquid-gas separator or knockout drum. Methylcyclopentadiene is recovered from the bottom portion of the separator, dimerized in a first soaking zone to form di-methylcyclopentadiene, and distilled to separate the monomer and lighter hydrocarbons present. From the knockout drum some monomer and lighter hydrocarbons including hydrogen are recovered as gases and passed to an absorption zone wherein product methylcyclopentadiene dimer is passed counter-currently to the monomer containing stream to scrub out at least a substantial portion of the remaining monomer. The methylcyclopentadiene dimer containing the adsorbed monomer is then combined with the dimer product from the first soaking zone and distilled in a distillation unit to recover the methylcyclopentadiene dimer. Separate feed stream to the distillation unit may be employed. Under distillation conditions, appreciable amounts of the dimer crack to the monomer and are recovered as overhead with other $C_6$ and lighter hydrocarbons. After separation of $C_5$ and lighter hydrocarbons, the remaining monomer and other $C_6$ hydrocarbons are passed through a second soaking zone to dimerize a substantial portion of the remaining monomer. The methylcyclopentadiene dimer produced in this second soaking zone is recycled to the fractionating or distillation zone for recovery of the product.

The above general description of the present invention incorporates a combination of novel steps which include dimerization of the methylcyclopentadiene followed by distillation or flashing. Two dimerization stages are used, one prior to the distillation and one applied to the overhead from the distillation after the light ends are removed in order to recover the monomer unavoidably formed in the distillation and the monomer which is present in the distillation feed.

In addition, the present process contemplates the use of methylcyclopentadiene dimer product as absorber or scrubber oil for the absorption unit following the initial separation of methylcyclopentadiene from lighter hydrocarbons. By this technique, contamination of the product is minimized. Additionally, separation of the $C_6$ hydrocarbon stream subsequent to the second soaking stage permits recycle of unconverted feed to the dehydrogenation unit thus increasing overall conversion and yield.

To adequately describe the invention, reference is now had to the drawing which depicts one flow diagram of the process. It is to be understood that the scope of the invention is not restricted to the specific scheme set forth in the drawing and that various modifications which are within the skill of the art may be applied to the process.

In the drawing, fresh feed which may comprise methyl substituted $C_5$ cyclic hydrocarbons more saturated than methylcyclopentadiene is passed via line 1 through a preheating zone 2 and furnace 3 to raise the temperature of the feed to reaction conditions. While various feeds may be utilized, a typical composition would comprise a $C_6$ fraction from a light virgin naphtha which has been concentrated by paraffin extraction and fractionation to increase the concentration of methylcyclopentane. Such a stream, for example, may have from 50 to 90% methylcyclopentane, 1 to 10% normal hexane, and the remainder being branched $C_6$ paraffins such as 3-methylpentane, benzene and cyclohexane. Another source for the feedstock of this process is a catalytically cracked naphtha fraction which would comprise a mixture of methylcyclopentene and methylcyclopentane together with smaller amounts of paraffinic and olefinic hydrocarbons within the same boiling range. Another source for the feedstock of this process is a high purity methylcyclopentane stream obtained by isomerization of cyclohexane and subsequent recovery from the unisomerized cyclohexane. Continuing, the fresh feed after preheating in furnace 3 is passed into dehydrogenation unit 4 containing a conventional dehydrogenation catalyst such a platinum on silica, palladium on silica, $Cr_2O_3$ on $Al_2O_3$, $MgO$-$Fe_2O_3$-$CuO$-$K_2O$ and the like. The particular catalyst employed is not regarded as a critical feature of this invention. Dehydrogenation conditions include 300 to 900° C. and 0 to 100 p.s.i.a. Reaction conditions for the dehydrogenation of methylcyclopentane and methylcyclopentene are well known in the art. Preferably, together with fresh preheated feed, there will be employed recycle $C_6$ stream from the tail end of the unit via line 5 in the ratio of approximately 0 to 8 volumes of liquid recycle per volume of liquid feed although for feed availability reasons and economics, preferably a recycle of at least 1 volume per volume of feed will be employed. A typical conversion by resort to this process on a once through basis is in the order of 10 to 70%. Utilizing a 4 to 1 ratio of recycle to feed, the overall conversion may be raised to between 30 and 95%. The dehydrogenated feed containing substantial amounts of methylcyclopentadiene is passed via line 6 optionally into quench tower 7 for the purpose of quenching and cooling the reaction mixture. Additionally, hydrogen from absorption unit 20 to be described subsequently is recycled via line 8 into the feed stream to the dehydrogenation reactor. The hydrogen cycle is preferred in a mole ratio of 0 to 10 based on total feed for the purpose of minimizing or eliminating coke formation within the reactor. The operation of the quench tower, as noted previously, is to halt the reaction and partially cool the product. As quench oil, any conventional medium to heavy paraffinic oil preferably boiling in the 150 to 400° C. range may be employed. The dimer product, if desired, may be employed as quench oil. Typically, 2 to 30 parts by weight quench oil per part of reaction product are recycled counter-currently through the quench tower to lower the temperature below the cracking conditions, e.g. 300° C. The heated quench oil leaves the quench tower via line 8' and may be employed to preheat the fresh feed at 2, or to provide heat for other purposes such as through heat exchanger 9. Pump 10 circulates the quench oil back to the upper portion of the tower completing the cycle. The methylcyclopentadiene containing stream leaves the quench tower via line 11 through compressor 12 wherein the pressure is increased to 15 to 200 p.s.i.a., or sufficient to condense most of the $C_6$ and heavier hydrocarbons when the the temperature is subsequently reduced in cooler 14, and is then passed via line 15 to a separator 16. Separator 16 comprises a conventional drum maintained under 15 to 200 p.s.i. pressures to effect a separation of the hydrogen, a portion of the $C_6$ and nearly all of the lighter hydrocarbons which are removed in the gaseous state via line 17. While the bulk of the methylcyclopentadiene passes downwardly in the liquid state via line 18 into soaker 19, some of the monomer is taken overhead and passed to absorber 20. A portion of the methylcyclopentadiene dimer product recovered from the process is passed via line 21 to absorption tower 20 in a countercurrent flow to the $C_6$ and lighter hydrocarbon stream. Methylcyclopentadiene dimer in effect scrubs the $C_6$ and lighter stream to selectively remove additional monomer product and lighter hydrocarbons which are recovered as bottoms via line 22 and join the dimer product from soaker 19 in line 23. The scrubbing action in the absorber also permits the recovery via line 8 of relatively pure hydrogen suitable for recycle to the hydrogenation unit 4. Soaker or dimerizer 19 is maintained at 50 to 200° C., 0 to 500 p.s.i.g. for 0.5 to 20 hours. The combined monomer and dimer stream is passed via line 23 into a distillation zone 24 wherein the monomer and lighter hydrocarbons are recovered overhead via line 25 and methylcyclopentadiene dimer is recovered as a lower side stream from the distillation zone via line 26. Under the distillation conditions employed, e.g. 40 to 175° C., substantial cracking of dimer is unavoidable resulting in a recovery of some monomer overhead. The dimer and heavier materials may be separated as bottoms from 24 and subsequently distilled in another unit for recovery of the dimer product. Separate feed streams to the distillation unit 24 may be employed in lieu of combining them. The dimer may then pass through a cooler 27 and finally exit as product via line 29. Valve 30 will control the amount of scrubbing oil recycled to absorber 20. Turning again to the overhead from distillation zone 24, after condensing in 31, separating in 32, wherein most of the $C_5$ and nearly all of the lighter hydrocarbons are removed in the gaseous state via 33, the product is passed via pump 34, line 35, to a second soaking or dimerization zone 36. This dimerization zone may be maintained under essentially the same conditions as dimerization zone 19. The dimerized product is passed into zone 37 at 15 to 30 p.s.i. where hydrocarbons lighter than methylcyclopentadiene dimer are flashed overhead, condensed in 38, accumulated in drum 39, and recovered as streams 40 and 5. The bottoms from flash zone 37 which represent the methylcyclopentadiene dimer are recycled or refluxed back to the distillation zone via line 41 and recovered from a lower portion of the distillation zone via line 26. Heavier materials which may include small amounts of trimer and tetramer are rejected as bottoms from the distillation zone 24 via line 42.

In summary, the fresh methylcyclopentane stream is first heated to reaction temperatures preferably by the recycled quench oil and in a preheated furnace, and is subsequently passed to the dehydrogenation reactor wherein it is contacted with a catalyst and a hydrogen-rich by-product stream which minimizes coke formation. The vaporous product effluent from the dehydrogenation reactor, after rapid cooling which is preferred in order to minimize the formation of undesirable by-products, is subsequently compressed and cooled to effect a separation of most of the $C_6$ material and essentially all of the heavier material as liquid phase. $C_6$ and heavier material is then passed to a soaking drum to permit the formation of the di-methylcyclopentadiene. The vapor from the knockout drum containing the remaining $C_6$ hydrocarbons and lighter material is passed to the absorber wherein it is contacted with methylcyclopentadiene dimer product to effect a scrubbing and removal of the $C_6$ and lighter hydrocarbons to provide a relatively pure hydrogen gas for recycle. By the use of methylcyclopentadiene dimer product as the absorber oil or scrubbing oil in lieu of other oils, contamination from foreign materials is substantially minimized and an increased overall methylcyclopentadiene dimer yield is effected. The vaporous effluent from the absorber is a hydrogen rich stream which in part is recycled to the preheated furnace and in part withdrawn or purged from the system. The liquid stream from the soaker is joined with the bottom streams from the absorber and passed to a distillation unit wherein a separation between $C_6$ already present plus that formed by cracking dimer is effected. Since there are substantially no hydrocarbons between the $C_6$ and $C_{12}$ components, a very simple fractionating column with a few plates may be employed to obtain a relatively clean complete separation. The overhead from the distillation containing the $C_6$ hydrocarbons is then dimerized to effect a clean separation of methylcyclopentadiene from acyclic olefins and other close boiling hydrocarbons, e.g. methylcyclopentene and methylcyclopentane, and is refluxed to the distillation column to further maximize the product yield. In addition to the small amounts of monomer which are not picked up in the absorber and which pass through the distillation column, a certain percentage of the methylcyclopentadiene dimer will be cracked during the distillation process due to the necessary temperatures and residence time. Thus, cracked dimer or monomer are recovered, as indicated previously, by soaking the mixture after ridding the overhead of light hydrocarbons. This second soaking stage will allow the monomer to redimerize and coupled with a flashing step a substantially complete removal from the system of a vaporous hydrocarbon stream substantially free of methylcyclopentadiene and dimer is accomplished. The dimer removed via line 41 may be recovered as such in lieu of refluxing or recycling this stream to the distillation zone. The remaining $C_6$ components which will comprise methylcyclopentane and methylcyclopentene, the particular mixture depending on the feed to the dehydrogenation unit, is preferably recycled to the dehydrogenation reactor to effect a high overall conversion. The amount of recycle preferably employed will be dependent on the purity of the methylcyclopentane and/or methylcyclopentene in the fresh feed and upon the amount of by-product formed in the reactor. Without the above system of separation the unconverted feed could not be recycled to the dehydrogenation unit due to the specific nature of the impurities present. The recycle of substantial amounts of diene contamination would result in deactivation of the dehydrogenation catalyst. The small amounts of dienes if present could be removed by well-known techniques such as selective hydrogenation, etc.

To set forth the conditions of the invention in specific and general terms, reference is had to the following table which indicates the process conditions at critical points in the system referring specifically to the drawing.

Table

|  | General | Specific |
|---|---|---|
| Feed, Percent by Weight: |  |  |
| Methylcyclopentane | 20 to 100 | 81 |
| Methylcyclopentene | 20 to 100 | 0 |
| Cyclohexane | 0 to 20 | 6 |
| Hexane | 0 to 60 | 4 |
| Benzene | 0 to 20 | 1 |
| 3-Methylpentane | 0 to 20 | 8 |
| Stream or Unit Number: |  |  |
| 1 (Fresh Feed)—Weight, parts |  | 100 |
| 3 (Furnace)— |  |  |
| Temperature, °C | 300 to 900 | 550 |
| Pressure, p.s.i.a. | 0 to 100 | 14.7 |
| 5 (Recycle)—Weight, parts | 0 to 1000 | 300 |
| 10 (Quench Oil)— |  |  |
| Temperature, °C | 50 to 500 | 100 |
| Weight, parts | 200 to 12,000 | 2,000 |
| 16 (Separator)— |  |  |
| Temperature, °C | 30 to 100 | 60 |
| Pressure, p.s.i.a. | 15 to 200 | 25 |
| 17 (Gaseous Separator Effluent)—Weight, parts. | 5 to 330 | 50 |
| 18 (Liquid Separator Effluent)—Weight, parts. | 95 to 770 | 350 |
| 21 (Scrubbing Oil)—Weight, parts | 10 to 9,900 | 600 |
| 20 (Absorber)—Temperature, °C | 30 to 100 | 50 |
| 19 (Soaker)— |  |  |
| Temperature, °C | 50 to 200 | 90 |
| Pressure, p.s.i.a. | 15 to 500 | 70 |
| Time (holdup), Hrs | 0.5 to 20 | 6 |
| 36 (Soaker)— |  |  |
| Time, Hrs | 0.5 to 20 | 6 |
| Pressure, p.s.i.a. | 15 to 500 | 200 |
| Temperature, °C | 30 to 200 | 90 |

What is claimed is:

1. A method for maximizing the production and recovery of di-methylcyclopentadiene from a stream containing methylcyclopentadiene and lower and higher boiling compounds which comprises separating said stream into a first fraction containing most of the methylcyclopentadiene and other $C_6$ and higher hydrocarbons and a second fraction containing the remaining methylcyclopentadiene with other compounds boiling in and below the $C_6$ hydrocarbon boiling range, soaking said first fraction to convert the methylcyclopentadiene to di-methylcyclopentadiene, contacting said second fraction with di-methylcyclopentadiene product in an absorption zone to absorb and separate methylcyclopentadiene therefrom and to obtain as extract a hydrocarbon stream comprising methylcyclopentadiene and di-methylcyclopentadiene, distilling both said first fraction and said extract containing methylcyclopentadiene and the di-methylcyclopentadiene to recover di-methylcyclopentadiene product and recycling at least a portion of said di-methylcyclopentadiene product to said absorption zone to absorb additional methylcyclopentadiene from said second fraction.

2. A process in accordance with claim 1 wherein methylcyclopentadiene, unconverted feed and lighter hydrocarbons are separated in said distillation zone from di-methylcyclopentadiene, passing said separated methylcyclopentadiene containing stream to a second soaking zone, converting said methylcyclopentadiene to the di-methylcyclopentadiene, thereby separating unconverted feed and other impurities from di-methylcyclopentadiene, refluxing the thus obtained di-methylcyclopentadiene to said distillation zone and recovering the di-methylcyclopentadiene from said distillation zone as product.

3. A method for preparing di-methylcyclopentadiene from a methyl substituted $C_5$ cyclic hydrocarbon stream more saturated than methylcyclopentadiene which comprises reacting in a dehydrogenation reaction zone said stream in the presence of a dehydrogenation catalyst at elevated temperatures to convert a substantial portion of said stream to methylcyclopentadiene, condensing and separating in a first separation zone at least a major portion of said methylcyclopentadiene and other $C_6$ and higher hydrocarbons, soaking said separated methylcyclopentadiene containing stream in a first soaking zone to produce di-methylcyclopentadiene, also recovering a mixture containing the remaining methylcyclopentadiene with other $C_6$ and lighter compounds and passing said mixture to an absorption zone, passing di-methylcyclopentadiene countercurrently through said absorption zone to absorb substantially all of the methylcyclopentadiene in said mixture, distilling the methylcyclopentadiene containing stream obtained from said absorption zone and the di-methylcyclopentadiene stream from said first soaking zone, in a distillation zone to obtain therefrom di-methylcyclopentadiene as product and recycling a portion of said di-methylcyclopentadiene product to said absorption zone.

4. A method for maximizing product recovery of di-methylcyclopentadiene from a stream containing methylcyclopentadiene and lower boiling compounds including hydrogen which comprises passing said stream to a separation zone, separating said stream into two fractions, the first containing most of the methylcyclopentadiene and other $C_6$ hydrocarbons and the second stream containing the remaining methylcyclopentadiene and lighter compounds boiling in and below the $C_6$ hydrocarbon boiling range, scrubbing said second stream with di-methylcyclopentadiene product in an absorption zone to remove substantially all of the methylcyclopentadiene and lighter hydrocarbons therefrom, whereby a substantially pure hydrogen gas is separated from said second stream, passing said hydrocarbon stream from the absorption zone to a distillation zone, soaking said first-named stream to convert the methylcyclopentadiene to di-methylcyclopentadiene and also passing this stream to said distillation zone, recovering from said distillation zone di-methylcyclopentadiene product and a methylcyclopentadiene containing stream.

5. A process according to claim 4 wherein said methylcyclopentadiene containing stream recovered from said distillation zone is soaked in a second soaking zone to convert substantial amounts of the methylcyclopentadiene to dimer product, recycling said dimer product to said distillation zone and recovering said dimer product with the remaining di-methylcyclopentadiene product.

6. A method in accordance with claim 4 wherein said methylcyclopentadiene containing stream is recovered from said distillation zone and is passed to a soaking zone to dimerize substantial amounts of the methylcyclopentadiene, separating the thus dimerized methylcyclopentadiene from the remaining hydrocarbons which comprise unconverted feed.

7. A method in accordance with claim 6 wherein said unconverted feed comprising stream contains diolefins wherein said diolefins are removed prior to passing said unconverted feed to a dehydrogenation reaction zone adapted to the dehydrogenation of a more saturated methyl substituted $C_5$ cyclic hydrocarbon to methylcyclopentadiene.

8. A method of producing di-methylcyclopentadiene product from a hydrocarbon stream containing methyl substituted $C_5$ cyclic hydrocarbons more saturated than methylcyclopentadiene which comprises reacting in a reaction zone said stream in the presence of hydrogen and a dehydrogenation catalyst at elevated temperatures to convert a substantial portion of said methyl substituted $C_5$ cyclic hydrocarbons to methylcyclopentadiene, separating a liquid fraction from the dehydrogenated stream containing most of the methylcyclopentadiene and as a gaseous fraction $C_6$ and lighter hydrocarbons including hydrogen, passing said liquid fraction to a soaking zone to produce a dimethylcyclopentadiene comprising stream, concomitantly scrubbing said gaseous fraction with di-methylcyclopentadiene to absorb in an absorption zone the methylcyclopentadiene and the lighter hydrocarbons, and to separate from said absorption relatively pure hydrogen, distilling the methylcyclopentadiene containing stream from said absorption zone and the di-methylcyclopentadiene containing stream from said soaking zone in a distillation zone to recover di-methylcyclopentadiene product and a methylcyclopentadiene containing stream which also contains unconverted feed and lighter hydrocarbons, soaking said methylcyclopentadiene containing stream to produce di-methylcyclopentadiene, recycling the thus produced di-methylcyclopentadiene to said distillation zone to recover it with the remaining di-methylcyclopentadiene product, separating unconverted hydrocarbons and recycling said unconverted hydrocarbons to said reaction zone.

9. A process in accordance with claim 8 wherein said separated hydrogen from said absorption zone is recycled to said reaction zone.

References Cited in the file of this patent

UNITED STATES PATENTS

| | | |
|---|---|---|
| 2,593,446 | Heinemann | Apr. 22, 1952 |
| 2,745,889 | Johnston et al. | May 15, 1956 |
| 2,751,422 | Nelson et al. | June 19, 1956 |